United States Patent [19]

Vicik

[11] Patent Number: 4,857,408

[45] Date of Patent: * Aug. 15, 1989

[54] MEAT ADHERABLE COOK-IN SHRINK FILM

[75] Inventor: Stephen J. Vicik, Darien, Ill.

[73] Assignee: Viskase Corporation, Chicago, Ill.

[*] Notice: The portion of the term of this patent subsequent to Aug. 15, 2006 has been disclaimed.

[21] Appl. No.: 172,831

[22] Filed: Mar. 25, 1988

Related U.S. Application Data

[63] Continuation-in-part of Ser. No. 946,722, Dec. 29, 1986, Pat. No. 4,734,327.

[30] Foreign Application Priority Data

Dec. 18, 1987 [CA] Canada .................................... 554879
Dec. 21, 1987 [EP] European Pat. Off. ....... 87-118920.5

[51] Int. Cl.$^4$ ........................ B32B 27/08; B32B 27/16
[52] U.S. Cl. .............................. 428/474.4; 428/474.7; 428/515; 428/516
[58] Field of Search .................... 428/35, 474.5, 474.7, 428/515, 516, 332

[56] References Cited

U.S. PATENT DOCUMENTS

| | | | |
|---|---|---|---|
| 3,355,319 | 11/1967 | Rees ....................................... | 428/35 |
| 4,469,742 | 9/1984 | Oberle et al. .......................... | 428/35 |
| 4,606,922 | 8/1986 | Schirmer ................................ | 428/35 |
| 4,647,483 | 3/1987 | Tse et al. ............................ | 428/474.4 |
| 4,724,185 | 2/1988 | Shah ....................................... | 428/35 |
| 4,734,327 | 3/1988 | Vicik ................................... | 428/515 |

Primary Examiner—Paul J. Thibodeau
Attorney, Agent, or Firm—John C. LeFever

[57] ABSTRACT

An irradiated four layer meat-adherable heat shrinkable film comprising an ionomer first layer, a second layer of anhydride adhesive-EVOH blend, a third layer of EVOH-amide polymer blend, and a fourth layer of anhydride adhesive-EVOH blend.

25 Claims, No Drawings

MEAT ADHERABLE COOK-IN SHRINK FILM

RELATED APPLICATION

This application is a continuation-in-part of Ser. No. 946,722 filed Dec. 29, 1986 in the name of Stephen J. Vicik and entitled "Cook-In Shrink Film" issued Mar. 29, 1988 as U.S. Pat. No. 4,734,327.

BACKGROUND OF THE INVENTION

This invention relates generally to heat shrinkable, relatively gas impermeable thermoplastic multilayer films which can be used in the form of a hermetically sealed bag for cook-in packaging meat products wherein the packaged meat is submerged in heated water for cooking and bonds or adheres with the film's inner surface. Under these conditions the bag film is shrinkable against the adhering meat and retains its integrity.

As used herein, "cook-in" refers to packaging material structurally capable of withstanding exposure to long and slow cooking conditions while containing a food product, for example submersion in water at 70°–80° C. (158° C.–176° F.) for 4–6 hours. Cook-in packaged foods are essentially pre-packaged, pre-cooked foods which may be directly transferred to the consumer in this form. These types of foods may be consumed with or without warming. Cook-in packaging materials maintain seal integrity and in the case of multilayer films, are delamination resistant. Cook-in films must also be heat shrinkable under cook-in conditions so as to form a tightly fitting package.

Cook-in films preferably have a tendency for adhesion to the food product, thereby preventing "cook-out", which is the collection of juices between the outer surface of the food product and the inner surface of the film.

There are numerous other requirements for a meat-adherable cook-in shrink film including: delamination resistance, low oxygen permeability, heat shrinkability representing about 20–50% biaxial shrinkage at about 90° C. (194° F.), and for certain applications optical clarity.

In U.S. Pat. No. 4,606,922 the prior art has proposed for meat adhesion, a multilayer film inner surface of an ionomer of a metal salt neutralized copolymer of an olefin and a carboxylic acid, said ionomer having been treated with ionizing radiation to a dosage sufficient to cause bonding with the meat product. As described in Patent '922, the olefin is preferably ethylene and the carboxylic acid is preferably acrylic acid or methacrylic acid. A representative ionomeric material of this class is commercially available as Surlyn TM from the Du Pont Company, and described in detail in U.S. Pat. No. 3,355,319.

The aforementioned U.S. Pat. No. 4,606,922 also describes an irradiated multilayer food casing having an outer nylon layer over one or more interior layers and having a Surlyn food contact inner surface. For example, the structure may comprise nylon (outer)/adhesive/Surlyn (inner). Nylon is described as providing an oxygen barrier to impede the inward diversions of oxygen and to impart relatively high stuffing strength to the casing. However, this film is not shrinkable and must be stuffed with a flowable meat product to insure sufficient film contact. Also, the nylon outer layer loses some of its effectiveness as an oxygen barrier because of moisture uptake from the atmosphere.

U.S. Pat. No. 4,606,922 also describes a four layer shrinkable film comprising EVA/PVDC/EVA/ionomer. However, the necessary irradiation has a degrading effect on the vinyl chloride-vinylidene chloride copolymer.

Another commercially employed cook-in film is the type described in Oberle et al U.S. Pat. No. 4,469,742, comprising six layers irradiated to dosage of preferably at least 6 MR. The central barrier layer is hydrolyzed ethylene-vinyl acetate copolymer (EVOH), chosen because of its higher softening point and superior oxygen barrier properties as compared to the PVDC-type barrier layer commonly used in multilayer films for ambient temperature applications. On each side of the barrier layer is an adhesive layer such as chemically modified polyethylene, eg. Plexar. On the outer side of each adhesive layer is a shrink layer such as ethylene-vinyl acetate copolymer (EVA), and the outside (abuse) layer is also the EVA type having a vinyl acetate content of about 5–12 wt. %. The innermost (heat sealing) layer may for example be an ionomer. Processing of a six layer film requires a complex die and limited resin selection.

It will be apparent from the foregoing that these prior art cook-in films are complex both in terms of multiple materials and sophisticated manufacturing techniques, and some are not heat shrinkable.

A possible solution to the foregoing problems is a four layer film with EVOH as the barrier layer and Surlyn as the inner layer, but tests have shown that such prior art films with even only three layers, i.e., no meat adhesion layer, either would not biorient, would tend to delaminate during cooking or have poor optical properties or have unacceptably low shrink value for cook-in applications, or a combination of these problems. Certain of these problems may be overcome by the use of EVOH-polyamide blend core layers, but multilayer films of this type with EVA inner and outer layers have typically been found to delaminate under cook-in conditions.

A possible approach to this delamination problem is the use of adhesives, but adhesives suitable for EVOH would not be expected to biorient, or in heavier gauges might be expected to be hazy or they might not provide the required shrinkage.

One object of this invention is to provide an improved meat-adherable cook-in type multilayer plastic film which has less than six layers.

Another object of this invention is to provide a less-than-six layer meat-adherable cook-in plastic film which is relatively easy to process, i.e., may be readily bioriented.

Still another object of this invention is to provide a less-than-six layer meat adherable cook-in type film having high shrink, good optical properties, good inner layer adhesion, and no blocking problem.

A further object of this invention is to provide such a less-than-six layer meat adherable cook-in type film which does not require additives such as processing aids and does not require high irradiation dosage levels on the order of 6 MR to realize high strength.

Other objects and advantages will be apparent from the ensuing disclosure and appended claims.

SUMMARY OF THE INVENTION

It has been unexpectedly discovered that all of the aforementioned objects may be achieved by a four layer meat adherable cook-in film comprising: (a) a first or adhering layer comprising an ionomer of a metal salt-neutralized copolymer of an olefin and a carboxylic acid, (b) a second or inner core layer directly adhered to one side of the first layer comprising a blend of between about 20 and 60 wt.% anhydride-modified ethylene copolymer adhesive having a Vicat softening point of at least about 90° C. (194° F.) and a melting point between the first layer and the hydrolyzed ethylene vinyl acetate copolymer of the third layer, and between about 40 and 80 wt.% ethylene vinyl acetate containing between about 9 and 15 wt.% vinyl acetate, the blend having a melt index up to and including about 0.9.

A third or barrier layer is directly adhered to the opposite side of the second layer form the first layer, and comprises a blend of between about 60 and 90 wt.%, hydrolyzed ethylene vinyl acetate copolymer containing between about 28 and 40 wt.% ethylene, and between about 10 and 40 wt.% amide polymer having a melting point below about 420° F. A fourth or abuse layer is directly adhered to the opposite side of the third layer from the second layer. This fourth layer comprises a blend of between about 10 to 40 wt.% anhydride-modified ethylene copolymer adhesive having a Vicat softening point of at least about 90° C. (194° F.) and a melting point between the first layer and the hydrolyzed ethylene vinyl acetate copolymer of the third layer, and between about 60 and 90 wt.% ethylene vinyl acetate containing between about 9 and 15 wt.% vinyl acetate, the blend having a melt index up to and including about 0.9.

The entire film is irradiated, preferably at a level of between about 2 and 4 MR.

DEFINITIONS

As used herein, the terms set forth below will be understood to have the following meanings:

"Polymer" includes homopolymers, copolymers, terpolymers and block, graft or random polymers.

"Amide" or "amide polymer" means a Nylon including polyaproamide, poly(hexamethylene adipamide), poly(hexamethylene sebacamide), poly(hexamethylenediamine dodecanedioc acid), polycapryllactam, poly (w-aminoundecanoic acid), and poly (w-dodecanolactam). These Nylons are respectively normally known as Nylon 6; Nylon 6,6; Nylon 6,10; Nylon 6,12; Nylon 8; Nylon 11; and Nylon 12. Another suitable amide polymer is Nylon 6,66 (Chemical Abstracts Service Number 24993-04-2). Still another suitable amide polymer is Nylon 6/12 manufactured by the copolymerization of epsilon-caprolactam and omega-laurolactam.

"Hydrolyzed ethylene-vinyl acetate" or "EVOH" means a hydrolyzed ethylene-vinyl acetate copolymer, preferably hydrolyzed to at least about 50%, most preferably to greater than about 99%. These compositions are also referred to as ethylene-vinyl alcohols and are ordinarily prepared by saponification, so are sometimes called "saponified ethylene-vinyl acetate copolymers".

"Linear low density polyethylene" or "LLDPE" means copolymers of ethylene and certain other heavier olefins as for example butene, hexene and octene, having a density of at least about 0.91 gm/cm$^3$ and below about 0.94 gm/cm$^3$.

"Very low density polyethylene" or "VLDPE" means copolymers of ethylene and higher alpha olefins containing from 3 to 8 carbon atoms, having a density below about 0.90/g/cm$^3$ and a 1% secant modulus below about 140,000 kPa.

"Anhydride" means a compound (usually an acid) from which water has been removed. An example is maleic anhydride.

"Anhydride-modified ethylene copolymer adhesive" means comprises an ethylene copolymer, as for example, LLDPE with anhydride grafted thereto, or a terpolymer comprising ethylene, a comonomer and an anhydride.

"Irradiation" means exposure to high energy radiation such as electrons, X-rays, gamma rays, beta rays and the like, which induce cross-linking between the molecules of the irradiated material. Preferably, irradiation is carried out by an electron accelerator and the dosage level is determined by standard dosimetry methods. The dosage is measured in "rads" wherein one rad is the absorbed dose of ionizing radiation equal to an energy of 100 ergs per gram of irradiation material. A megarad (MR) is one million rads.

"Adherable", "adhering" or "adheres" means that the meat contact surface of the multilayer film in package or envelope form bonds during cook-in to the contained meat product to an extent sufficient to prevent accumulation of fluids between the film contact surface and the meat.

DETAILED DESCRIPTION

The first (meat adherable) layer of this multilayer film is an ionomer of a metal salt-neutralized copolymer of an olefin and a carboxylic acid. The olefin is preferably ethylene and the carboxylic acid is preferably methacrylic acid, as for example, the previously referenced Surlyn type of compound. The selected compound for this first layer should have good heat sealability and provide good optical properties for clear films. This layer is in direct contact with the meat in adhering relation thereto. The first layer is preferably up to about 2.2 mils thick to perform its intended function. Thicker layers do not significantly improve performance, and may reduce flexibility of the overall film. The first (meat adhering) layer thickness is preferably at least 1.2 mils for heat sealability and to perform the meat adhering function, so that the preferred thickness range for this layer is between about 1.2 and 2.2 mils.

The second (inner core) layer of this multilayer film is directly adhered to one side of the first (meat adherable) layer, and is also directly adhered to the third (barrier) layer. The second layer provides adhesion between the first (meat adherable) layer and the third (barrier) layer, and also aids processability, for example, affording the needed bixial stretchability. This layer comprises a blend including between about 40 and 80% ethylene vinyl acetate (EVA) containing between about 9 and 15 wt.% vinyl acetate. The vinyl acetate content of the EVA blend component should be at least 9 wt.% of the EVA to provide the desired high shrink, but no higher than about 15 wt.% to allow the needed biaxial orientation. A preferred balance of these characteristics is a vinyl acetate content of between about 10 and 12 wt.% of the ethylene vinyl acetate.

The other component of the blend comprising this second (inner core) layer is between about 20 and 60 wt.% anhydride-modified ethylene copolymer adhesive. The latter comprises at least about 20 wt.% of the blend to provide the needed adhesion between the first and third layers under cook-in conditions and avoid blocking. The adhesive does not comprise more than about 60 wt.% of the blend to keep the melt index of this layer in the desired range for processing ease of the multilayer film. That is, the film must be readily processed for biaxial stretching to achieve the needed stretchability and high shrink in both TD and MD directions. Also, the adhesive component of the second layer blend should not be more than about 60 wt.% to retain the needed toughness (impact resistance) for the multilayer film. A preferred balance of these characteristics is an adhesive content of between about 30 and 45 wt.% (and 55–70% EVA) of the second layer. A blend comprising 50 wt.% EVA and 50 wt.% adhesive is not recommended.

The Vicat softening point of the adhesive component of the second layer blend should be at least about 194° F. (90° C.) so as to avoid delamination of the first-second layer and second-third layer interfaces during cooking.

The melting point of the adhesive component of the second layer blend should be between the first (meat adherable) layer and the EVOH component of the third (barrier) layer. If the melting point is too low, film performance during cooking may be affected by softening, and if too high it will adversely effect biaxial stretching for subsequent heat shrinkage. An adhesive melting point between that of the meat adhering layer and the EVOH does not adversely affect the overall film balance avoiding these characteristics. Preferably the adhesive component melting point is closer to the lower melting first (meat adherable) layer than the higher melting third layer EVOH component to maximize film shrinkage values. That is, relatively low processing temperatures provide relatively higher shrinkage.

The melt index of the second (inner core) layer is up to and including 0.9 so that the multilayer film may be readily biaxially oriented. Higher second layer melt indexes than about 0.9 result in weak films which cannot be stretched without tearing or process interruptions such as bubble breaks.

The thickness of the second (inner core) layer is preferably between about 0.2 and 0.35 mils. Thinner layers may not perform the aforedescribed functions while thicker layers do not appreciably improve processability of the film and may reduce film stretchability.

Suitable anhydride-modified ethylene copolymer adhesives for use in the blend of the second (inner core) layer include the maleic anhydride-modified linear low density polyethylene commercially known as Admer ™ NF-500 manufactured by Mitsui Petrochemical Industries Ltd. of Tokyo, Japan. According to the manufacturer, Admer NF-500 has a Vicat softening point of 100° C. or 212° F. (ASTM D1525) and a melting point of 120° C. or 248° F. (ASTM D2117).

Other possibly suitable adhesives include certain of the PLEXAR ™ compounds manufactured by the Chemplex Company of Rolling Meadows, IL, as summarized in the following Table A.

TABLE A

| Suitable PLEXAR Adhesives | | |
|---|---|---|
| Grade (Base) | Melt Index (g/10 sm) | Vicat Softening Point °C. (°F.) |
| 169 (modified low density polyethylene) | 2.6 | 94 (201) |
| 201 (modified high density polyethylene) | 0.85 | 127 (260) |
| 281 (modified linear low density polyethylene) | 1.8 | 127* (260) |

*melting point

With respect to the third (barrier) layer, the amide polymer performs a plasticizing function for the hydrolyzed ethylene vinyl acetate copolymer (EVOH) which is the oxygen barrier component. The amide polymer must comprise at least 10 wt.% of the amide polymer-EVOH blend for processing, i.e., stretchability, into a biaxially oriented film. On the other hand, to retain the oxygen barrier performance the amide polymer should not comprise more than about 40 wt.% of the blend. As a preferred balance of these characteristics, the third (barrier) layer comprises between about 70 and 85 wt.% hydrolyzed ethylene-vinyl acetate copolymer blended with between about 15 and 30 wt.% amide polymer.

The EVOH contains at least 28 wt.% ethylene to achieve the desired film shrinkage and stretching characteristics, and less than about 48 wt.% ethylene to achieve bubble integrity at the required stretch conditions. As a preferred balance of these characteristics, the hydrolyzed ethylene-vinyl acetate copolymer contains between about 32 and 38 wt.% ethylene.

The melting point of the amide polymer is below about 420° F. for compatability with the EVOH copolymer which typically melts between about 310° and 365° F. Higher melting amide polymers are not suitable because of the presence of gels and unmelted particles in the final film extruded at temperatures suitable for EVOH without degradation.

The third (barrier) layer constituents are provided in proportions and quantities such than the oxygen transmission rate through the entire multilayer film is below about 90 cc/M$^2$/mil thickness/24 hrs./Atm. This is necessary to avoid spoilage of the food enclosed in the cook-in film due to oxygen passage from the environment through the film wall. The third (barrier) layer thickness is preferably up to about 0.3 mils to perform its intended function for the cook-in application. Thicker barrier layers do not appreciably improve performance. The barrier layer is most preferably between about 0.05 and 0.3 mils thick to perform its intended function and provide maximum flexibility.

The fourth (abuse) layer of this multilayer film is directly adhered to the opposite side of the third (barrier) layer from the second (inner core) layer. This layer is in direct contact with the environment including the heating fluid during cook-in. Since it is seen by the user/consumer, it must enhance optical properties of the multilayer film. Also, it must withstand contact with sharp objects so is termed the abuse layer and provides abrasive resistance. The fourth layer comprises a blend including between about 60 and 90% ethylene vinyl acetate. As with the second (inner core) layer, the vinyl acetate should be at least about 9 wt.% of the EVA to provide the desired high shrink, but no higher than about 15 wt.% to allow the needed biaxial stretching for high shrink in both directions. A preferred balance between these characteristics is a vinyl acetate content of between about 10 and 12 wt.% of the ethylene vinyl acetate.

The other component blend is between about 10 to 40% anhydride-modified ethylene copolymer adhesive. This adhesive may, but need not, be the same adhesive as that used in the second (inner core) layer. The adhesive must comprise at least about 10 wt.% of the blend to provide the needed adhesion, and should be less than about 40 wt.% of the blend so as not to build in too much resistance to biaxial stretching. Any suitable adhesive tends to limit biaxial stretching and a higher adhesive content (up to 60 wt.%) may be needed in the second (inner core) layer to adequately bond the first and third layer. Another reason for the 40 wt.% adhesive upper limit in the fourth (abuse) layer is that for clear films, the adhesive should not adversely affect the films optical properties. That is, the clear multilayer film gloss should be at least 55% and the haze should be below about 15%. A preferred balance of these fourth layer properties is a blend comprising between about 10 and 20% by weight adhesive and between about 80 and 90% by weight vinyl acetate.

The Vicat softening point of the fourth layer adhesive should be at least about 194° F. (90° C.) and its melt index is up to and including about 0.9, each for the same reason previously discussed in connection with the second (inner core) layer.

The fourth (abuse) layer thickness is preferably between about 0.50 and 0.85 mils. Thinner layers may be less effective in providing the abuse resistance protection, while thicker layers may not improve performance in this respect and may reduce film stretchability.

The thickness of the aforedescribed four layer film is preferably between about 2.0 and 3.5 mils. Lower thicknesses reduce the effectiveness of at least one of the four layers to perform the aforedescribed functions, while higher thicknesses reduce the film flexibility and do not appreciably improve its performance.

The multilayer film of this invention is preferably irradiated at a level of between about 2 and 4 MR to increase its layer adhesion strength at cook-in conditions. Lower irradiation levels do not provide improved strength and higher levels tend to degrade the elongation properties of the film. Irradiation may be performed prior to biaxial orientation but is preferably done after this step on the stretched and thinner film.

A preferred four layer meat adherable cook-in film of this invention comprises a first or meat adherable layer comprising an ionomer of a metal salt-neutralized copolymer of ethylene and methacrylic and; a second or inner core layer directly adhered to one side of the first layer comprising a blend of between about 30 and 50 wt.% maleic anhydride-modified linear low density polyethylene adhesive having a Vicat softening point of about 212° F. and a melting point of about 248° F., and between about 50 and 70 wt.% ethylene vinyl acetate containing between about 10 and 12 wt.% vinyl acetate, said blend having a melt index of up to and including about 0.9; a third or barrier layer directly adhered to the opposite side of the second layer from the first layer and comprising a blend of between about 70 and 85 wt.% hydrolyzed ethylene vinyl acetate copolymer and between about 15 and 30 wt.% amide polymer; and a fourth or abuse layer directly adhered to the opposite side of the third layer from the second layer comprising a blend of between about 10 and 20 wt.% maleic anhydride-modified linear low density polyethylene and about 80 and 90 wt.% ethylene vinyl acetate having between about 10 and 12 wt.% vinyl acetate said blend having a melt index of up to and including about 0.9. The entire film is irradiated to between about 2 and 4 MR.

In general, various conventional additives such as slip agents and pigments can be incorporated in the film in accordance with conventional practice.

While this invention is specifically described in terms of four layers, it should be understood that one or more additional layers may be directly adhered to the outside of the fourth (abuse) layer.

The multilayer film of this invention is preferably manufactured in tubular form by simultaneous co-extrusion of the four layers, using the conventional double bubble technique as, for example, described in U.S. Pat. No. 3,555,604. Alternatively, the four layer film may be manufactured by the coating lamination version of the double bubble technique as, for example, described in U.S. Pat. No. 3,741,253. In the double bubble technique, the primary tube is biaxially oriented by stretching with internal pressure in the transverse direction and with the use of pinch rolls at different speeds in the machine direction. Then the bubble is collapsed. After cooling, the biaxially oriented tube is flattened and guided through an ionizing radiation field.

The stretch ratio in the biaxial orientation is preferably sufficient to provide a multilayer film with total thickness preferably between about 2.0 and 3.5 mils. A stretch ratio of about 12:1 to 20:1 may be used to impart a shrink capacity of about 30–45% free shrinkage at 90° C. (based on ASTM D2732).

The multilayer film is wound up as flattened, seamless, tubular film to be used later to make bags. This may be accomplished by end seals, typically made by transverse heat sealing across the width of flattened tubing followed by severing the tubing so that the transverse seal forms the bag bottom. Alternatively, side-seal bags may be formed in which the transverse seals form the bag sides and one edge of the tubing forms the bag bottom.

Cook-in bags are used by placing the food product in the bag, evacuating the bag and sealing the open portion as by clipping. The evacuated product-containing bag is then immersed in a hot liquid bath typically about 150° to 190° F., to uniformly shrink the film against the product outer surface.

EXAMPLE I

In this example, several four layer films of the same thickness (2.5 mils) and differing mainly in selection of the second (inner core) layer were compared in terms of manufacturing ease. In each instance the first (meat adherable) layer was formed of Surlyn 1650 with a layer thickness of about 1.6 mils.

The second (inner core) layer varied from sample to sample as summarized in Table B, and had a thickness of about 0.3 mils. The second (inner core) layer of sample 1 was ethylene vinyl acetate containing 15 wt.% vinyl acetate and having a melt index of 0.5. For sample 2 the inner core layer was an anhydride modified ethylene vinyl acetate adhesive sold under the commercial designation Bynel 3036 by the Du Pont Company, Wilmington, DE. According to the manufacturer, this anhydride compound has a Vicat softening point of about 140° F. and a melting point of about 189° F. It was selected for this experiment because of its recommended use as an EVOH layer adhesive in multilayer films with EVA and Surlyn. The inner core layer of sample 3 was the aforedescribed Admer NF-500. The inner core layer of sample 4 was a blend of 60 wt.% ethylene vinyl acetate and 40 wt.% Admer NF-500, the EVA component containing 12 wt.% vinyl acetate and having a 0.25 melt index. The inner core layer sample 4 blend had a 0.7 melt index.

The third (barrier) layer was a blend of 80 wt.% EVOH and 20 wt.% polyamide. The EVOH contained 38% ethylene and the polyamide was either a Nylon 6,66 having a melting point of about 405° F. (samples 1 and 2) of Nylon 6/12 having a melting point of about 385° F. (samples 3 and 4). The third layer had a thickness of about 0.08 mils.

The fourth (abuse) layer was the same for samples 1-4 and comprised a blend of 95 wt.% ethylene vinyl acetate having 12% vinyl acetate content, and 5 wt.% linear low density polyethylene having a 0.918 density and 1.0 melt index. The melt index of the fourth layer was 0.4 and its thickness was 0.55 mils.

Each of the samples 1-4 was prepared by simultaneous co-extrusion of the four layers using the conventional double bubble technique, and the processing performance is summarized in Table B.

TABLE B
Effect Of Inner Core Selection

| Film* Sample No. | Inner Core Layer | Processing Performance |
|---|---|---|
| 1 | EVA (15% vinyl acetate, 0.5 melt index) | Relatively easy to biaxially stretch |
| 2 | Anhydride modified EVA adhesive (Bynel 3036) | Very difficult to biaxially stretch |
| 3 | Maleic anhydride modified LLDPE adhesive (Admer NF-500) | Very difficult to biaxially stretch |
| 4 | 60% EVA (12% vinyl acetate, 0.25 melt index), 40% Admer NF-500 | Relatively easy to biaxially stretch |

*Four layer films with remaining three layers identical except that third layers of samples 1 and 2 included Nylon 6,66 in the blend whereas third layers of samples 3 and 4 included Nylon 6/12 in the blend.

As indicated in Table B, samples 1 and 4 were relatively easy to biaxially stretch whereas samples 2 and 3 were very difficult to biaxially stretch. More specifically, for the last mentioned samples the bubble was weak and broke easily during biorientation, and continuous operation was very difficult to achieve. This was in marked contrast to samples 1 and 4 which were characterized by a strong stable bubble during biorientation and smooth continuous operation.

Notwithstanding its processing ease, sample 1 had numerous striations. These were ridges in the machine direction which encompassed the full circumference of the film, and noticeable as a visual defect. These striations were probably due to flow instability in the multilayer die caused by melt rheology differences between layers. Because of these defects, sample 1 could not be commercially acceptable.

Sample 4 was easy to process but other tests have indicated that films of this type with no adhesive in the fourth (abuse) layer tend to delaminate during biorientation, so would not be capable of handling for subsequent irradiation to improve adhesion. Accordingly, sample 4 would not be commercially acceptable.

This Example I demonstrates that the as-defined second (inner core) layer blend of non-orientable anhydride-modified ethylene copolymer adhesive and orientable EVA permits relatively easy processing of the four layers into a shrink film which is visually acceptable for use as a cook-in shrink film. It was surprising that an inner core layer blend of an orientable resin and an adhesive resin which does not support orientation by itself, was readily processed into a multilayer film. This was unexpected because according to prior art practice the addition of a non-orientable resin usually very quickly weakens the film structure otherwise formed by extrusion from an orientable resin, and prevents continuous production. In this instance the opposite happened, possibly because of the averaging effect of the other three layers. This effect is not predictable since other four layer films with anhydride-adhesive type second (inner core) layers (samples 2 and 3) were very difficult to biaxially stretch even though supported by orientable layers on either side. It should be noted however that in spite of its processing ease, sample 4 was unacceptable because of its delamination tendency.

EXAMPLE II

Another series of tests were conducted to demonstrate both the importance of the adhesive in the inner core layer and the effect of irradiation on layer adhesion and seal strength, for the four layer film of this invention.

In both samples 5 and 6, the third (barrier) layer was 80% EVOH (38% ethylene) and 20% amide polymer. For sample 5 the amide was Nylon 6,66 and for sample 6 (this invention) the amide was Nylon 6/12. The EVA used in the second (inner core) layer of both samples 5 and 6 contained 12% vinyl acetate. The anhydride adhesive used in the second (inner core) layer and the fourth (abuse) layer of sample 6 was Admer NF-500. In these tests, the tensile strength was measured in accordance with ASTM D 882, wherein the test specimen was extended at a constant rate and the force recorded on a chart. Delamination was evidenced by discontinuities in the stress-strain response.

The seal strength was measured by first sealing the film edges to form a bag. Water was placed inside the bag and the water-filled bag placed in a hot water bath maintained at 90° C. The time for seal failure was noted with one hour (at 90° C.) as the test cut-off. The film samples were prepared by co-extrusion of the four layers in the same manner as the Example 1 samples. Certain of the resulting films were then tested for tensile strength and seal strength, and other samples were irradiated at 3 MR prior to tensile and seal strength testing. The test results are summarized in Table C.

TABLE C
Effect Of Irradiation On Layer Adhesion And Seal Strength

| Film Sample No | Composition | Tensile Test Unirrad | Irrad | Seal Strength Unirrad | Irrad |
|---|---|---|---|---|---|
| 5 | Surlyn/80% | Delam | Good | Failed | Passed |

TABLE C-continued

Effect Of Irradiation On Layer Adhesion And Seal Strength

| Film Sample No | Composition | Tensile Test Unirrad | Tensile Test Irrad | Seal Strength Unirrad | Seal Strength Irrad |
|---|---|---|---|---|---|
| 6 | EVA-20% LLDPE/ 20% Nylon*- 80% EVOH/ 95% EVA- 5% LLDPE Surlyn/80% EVA-20% Adh/ 20% Nylon*- 80% EVOH/ 90% EVA- 10% Adh | Good Adh | Ad Good Adh | Failed | Passed |

*For Sample 5, nylon 6,66 and for Sample 6, Nylon 6/12

It will be noted from Table C that sample 5 did not include the anhydride-modified ethylene copolymer adhesive in the second (inner core) layer, or the fourth (abuse) layer as did sample 6. Because of these differences, sample 5 tended to delaminate during biaxial stretching or with minimal handling, whereas sample 6 did not. Accordingly, in commercial practice it would be virtually impossible to utilize sample 5 in further converting steps such as irradiation, printing or sealing without delamination. In Example II this problem was avoided by careful manual transfer during the experiment.

Table C also shows that even sample 6 did not provide satisfactory seal strength at 194° F. (90° C.) in the unirradiated condition, but irradiation at 3 MR overcame this deficiency. As previously noted, this is a relatively low level compared to prior art teachings of a preferred dosage at least 6 MR.

EXAMPLE III

In these tests, the physical and optical properties of a four layer film embodiment of this invention were compared with an apparently six layer commercially available cook-in film of the general type described in the aforementioned U.S. Pat. No. 4,469,752 and employing Surlyn as a first (meat adhering) layer. Sample 7 comprised a Surlyn 1650 first (meat adherable) layer, a 60 wt.% EVA (12% vinyl acetate)-40% Admer NF-500 anhydride adhesive blend second (inner core) layer, an 80% EVOH-20% Nylon 6,12 third (barrier) layer, and a 90% EVA (12% vinyl acetate)-10% Admer NF-500 anhydride adhesive blend fourth (abuse layer). Sample 7 was prepared by co-extrusion of the four layers in same manner as Example I, and irradiated to 3 MR.

The sample 8 prior art film was manufactured by W. R. Grace Company's Cryovac Division and sold with a product designation CN-510. It appeared to comprise six layers, i.e., Surlyn/EVA/adhesive/EVOH/adhesive/EVA. The irradiation level is unknown but the manufacturer's aforementioned U.S. Pat. No. 4,469,742 describing this type of film states that irradiation dosage of at least 6 MR is preferred. The results of these property comparison tests are summarized in Table D.

TABLE D

| Film Properties | Sample 7 | Sample 8 |
|---|---|---|
| Gauge, Mils | 2.5 | 3.3 |
| Tensile Strength,PSI,MD (ASTM D-892) TD | 8,000 8,600 | 5,400 5,900 |
| % Elongation @ Brk,MD TD | 200 140 | 250 160 |
| Secant Modulus,PSI,MD TD | 50M 55M | 16M 20M |
| % Shrinkage @ 90° C.,MD TD | 27 35 | 32 43 |
| Haze, % (ASTM D-1003) | 3.0 | 10 |
| Gloss, % (ASTM D-2457) | 82 | 67 |
| O$_2$ Permeability cc/100 in.2/24 hrs. | 1.60 | 0.35 |
| Dynamic Puncture, Kg-cm/Mil | 1.60 | 1.4 |

Table D shows that the four layer film of this invention has at least comparable physical properties to the six layer prior art film sample 8. Sample 7 has higher oxygen permeability (62 cc/M$^2$/mil thickness/24 hrs/Atm) than sample 8, but as previously indicated this level of oxygen barrier is considered satisfactory by commercial standards for meat-adhering cook-in films.

EXAMPLE IV

In this series of tests, a previously described four layer film of this invention (sample 7) along with the prior art six layer film (sample 8) were formed into seamed tubes with one end sealed. The resulting articles were hand stuffed with chunked, sweet pickled hams, placed in molds and hot water immersion cooked at 180° F. until the internal temperature reached 150° F. The results of these cook-in tests are summarized in Table E.

TABLE E

| Sample No. | Flat Width (in) | Cook-In Tests Cook Yield (%) | Overall Yield (a) (%) | Adhesion (b) |
|---|---|---|---|---|
| 7 | 9.0 | 99.9 | 99.5 | 5 |
| 8 | 9 | 99.8 | 99.7 | 5 |

(a)Overall Yield % = $\frac{\text{(cooked weight)} - \text{(purge weight)}}{\text{(raw weight)}} \times 100$ (b)Rated on a 1–5 scale; 1 = no adhesion, 5 = complete adhesion of film to product.

Sample 7 experienced two seam splits during stuffing, but this was not due to a film deficiency. Table E shows that both samples had excellent film cook yield, overall yields and adhesion. Accordingly, Example IV demonstrates that the four layer film of this invention is functionally equivalent to a six layer commercially employed prior art film in ham cook-in performance.

While the preferred embodiments of the invention have been disclosed hereinabove, those skilled in the art will appreciate that changes and modifications may be made therein without departing from the spirit and scope of the invention.

What is claimed is:

1. A four layer meat-adherable cook-in shrink film comprising:
   (a) a first or meat adherable layer comprising an ionomer of a metal salt-neutralized copolymer of an olefin and a carboxylic acid;
   (b) a second or inner core layer directly adhered to one side of said first layer comprising a blend of between about 20 and 60 wt.% anhydride-modified ethylene copolymer adhesive having a Vicat softening point of at least about 194° F. and a melting point between said first layer and the hydrolyzed ethylene vinyl acetate copolymer of the third layer, and between about 40 and 80 wt.% ethylene vinyl acetate containing between about 9 and 15 wt.% vinyl acetate, said blend having a melt index up to and including about 0.9;
   (c) a third or barrier layer directly adhered to the opposite side of said second layer from said first layer and comprising a blend of between about 60 and 90 wt.% hydrolyzed ethylene vinyl acetate copolymer containing between about 28 and 40 wt.% ethylene, and between about 10 and 40 wt.% amide polymer having a melting point below about 420° F.;
   (d) a fourth or abuse layer directly adhered to the opposite side of said third layer from said second layer comprising a blend of between about 10 to 40 wt.% anhydride-modified ethylene copolymer adhesive having a Vicat softening point of at least about 194° F. and a melting point between said first layer and said hydrolyzed ethylene vinyl acetate copolymer of said third layer, and between about 60 and 90 wt.% ethylene vinyl acetate containing between about 9 and 15 wt.% vinyl acetate, said blend having a melt index up to and including about 0.9; and
   (e) the entire film being irradiated.

2. A film according to claim 1 wherein said first layer comprises an ionomer of a metal salt-neutralized copolymer of ethylene and methacrylic acid.

3. A film according to claim 1 wherein said adhesive of said second layer is anhydride-modified linear low density polyethylene.

4. A film according to claim 1 wherein said adhesive of said second layer is maleic anhydride-modified linear low density polyethylene.

5. A film according to claim 1 wherein said adhesive of said second layer is anhydride-modified low density polyethylene.

6. A film according to claim 1 wherein said adhesive of said second layer is anhydride-modified medium density polyethylene.

7. A film according to claim 1 wherein said adhesive of said second layer is anhydride-modified high density polyethylene.

8. A film according to claim 1 wherein said adhesive of said second layer is anhydride-modified ethylene vinyl acetate.

9. A film according to claim 1 wherein said second layer comprises a blend of between about 30 and 45 wt.% anhydride-modified ethylene copolymer adhesive, and between about 55 and 70 wt.% ethylene vinyl acetate.

10. A film according to claim 1 wherein said ethylene vinyl acetate of said second layer contains between about 10 and 12 wt.% vinyl acetate.

11. A film according to claim 1 wherein said adhesive of said fourth layer is anhydride-modified linear low density polyethylene.

12. A film according to claim 1 wherein said adhesive of said fourth layer is maleic anhydride-modified linear low density polyethylene.

13. A film according to claim 1 wherein said adhesive of said fourth layer is anhydride-modified low density polyethylene.

14. A film according to claim 1 wherein said adhesive of said fourth layer is anhydride-modified medium density polyethylene.

15. A film according to claim 1 wherein said adhesive of said fourth layer is anhydride-modified high density polyethylene.

16. A film according to claim 1 wherein said adhesive of said fourth layer is anhydride-modified ethylene vinyl acetate.

17. A film according to claim 1 wherein said fourth layer comprises a blend of between about 10 and 20 wt.% anhydride-modified ethylene copolymer adhesive, and between about 80 and 90 wt.% ethylene vinyl acetate.

18. A film according to claim 1 wherein said ethylene vinyl acetate of said fourth layer contains between about 10 and 12 wt.% vinyl acetate.

19. A film according to claim 1 wherein said third layer comprises a blend of between about 70 and 85 wt.% hydrolyzed ethylene vinyl acetate copolymer and between about 15 and 30 wt.% amide polymer.

20. A film according to claim 1 wherein said amide polymer in the core layer is a Nylon 6 copolymer.

21. A film according to claim 20 wherein said Nylon 6 copolymer is Nylon 6/12.

22. A film according to claim 20 wherein said Nylon 6 copolymer is Nylon 6,66.

23. A film according to claim 2 wherein said hydrolyzed ethylene vinyl acetate copolymer of said third layer contains between about 32 and 38 wt.% ethylene.

24. A film according to claim 1 which is irradiated to between about 2 and 4 MR.

25. A four meat adherable layer cook-in shrink film comprising:
   (a) a first or meat adherable layer comprising an ionomer of a metal salt-neutralized copolymer of ethylene and methacrylic acid;
   (b) a second or inner core layer directly adhered to one side of said first layer comprising a blend of between about 30 and 50 wt.% maleic anhydride-modified linear low density polyethylene adhesive having a Vicat softening point of about 212° F. and a melting point of about 248° F., and between about 50 and 70 wt.% ethylene vinyl acetate containing between about 10 and 12 wt.% vinyl acetate, said blend having a melt index of up to and including about 0.9;
   (c) a third or barrier layer directly adhered to the opposite side of said second layer from said first layer and comprising a blend of between about 70 and 85 wt.% hydrolyzed ethylene vinyl acetate copolymer and between about 15 and 30 wt.% amide polymer; and
   (d) a fourth or abuse layer directly adhered to the opposite side of said third layer from said second layer comprising a blend of between about 10 and 20 wt.% maleic anhydride-modified linear low density polyethylene and between about 80 and 90 wt.% ethylene vinyl acetate having between about 10 and 12 wt.% vinyl acetate, said blend having a melt index of up to and including about 0.9; and
   (e) the entire film being irradiated to between about 2 and 4 MR.

* * * * *

UNITED STATES PATENT AND TRADEMARK OFFICE
CERTIFICATE OF CORRECTION

PATENT NO. : 4,857,408
DATED : August 15, 1989
INVENTOR(S) : Stephen J. Vicik

It is certified that error appears in the above-identified patent and that said Letters Patent is hereby corrected as shown below:

In col. 9, line 16, first instance, change "of" to --or--.

In col. 9, Table B under Sample No., line 33, add --1--.

In col. 14, line 34, claim No. 23, change "2" to --1--.

Signed and Sealed this

Fourteenth Day of May, 1991

Attest:

*Attesting Officer*

HARRY F. MANBECK, JR.

*Commissioner of Patents and Trademarks*